US011352375B2

United States Patent
Martins Junior et al.

(10) Patent No.: US 11,352,375 B2
(45) Date of Patent: Jun. 7, 2022

(54) AUXILIARIES FOR OLEFIN POLYMERIZATION PROCESS

(71) Applicant: Braskem S.A., Camaçari (BR)

(72) Inventors: Olavo Martins Junior, São Paulo (BR); Dihogenes Adriano Pozzer, São Paulo (BR); Élita Cavalli, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 16/729,032

(22) Filed: Dec. 27, 2019

(65) Prior Publication Data

US 2020/0207791 A1 Jul. 2, 2020

Related U.S. Application Data

(60) Provisional application No. 62/785,865, filed on Dec. 28, 2018.

(51) Int. Cl.
C07F 5/06 (2006.01)

(52) U.S. Cl.
CPC .................. C07F 5/069 (2013.01)

(58) Field of Classification Search
None
See application file for complete search history.

(56) References Cited

U.S. PATENT DOCUMENTS

| | | |
|---|---|---|
| 3,917,466 A | 11/1975 | Henry, Jr. |
| 4,115,639 A | 9/1978 | Brown et al. |
| 4,416,668 A | 11/1983 | Thompson |
| 4,792,592 A | 12/1988 | Fulks et al. |
| 4,803,251 A | 2/1989 | Goode et al. |
| 4,855,370 A | 8/1989 | Chirillo et al. |
| 5,026,795 A | 6/1991 | Hogan |
| 5,391,657 A | 2/1995 | Song et al. |
| 5,712,352 A | 1/1998 | Brant et al. |
| 6,180,729 B1 | 1/2001 | Lange et al. |
| 6,201,076 B1 | 3/2001 | Etherton et al. |
| 6,476,165 B1 | 11/2002 | Wang |
| 6,689,846 B1 | 2/2004 | Leskinen et al. |
| 7,838,607 B2 | 11/2010 | Mihan |
| 8,017,703 B2 | 9/2011 | Schwind et al. |

(Continued)

FOREIGN PATENT DOCUMENTS

| | | |
|---|---|---|
| CN | 107189172 A | 9/2017 |
| CN | 107641206 A | 1/2018 |

(Continued)

OTHER PUBLICATIONS

Safety Data Sheet for Stadis 450, 2011, 1-17.*

(Continued)

*Primary Examiner* — Clinton A Brooks
(74) *Attorney, Agent, or Firm* — Osha Bergman Watanabe & Burton LLP (57) ABSTRACT

A method of forming polymerization auxiliaries for a polymerization process may include combining an antifouling agent with a killer agent to form an auxiliary composition; and contacting the auxiliary composition with an alkylaluminum. An antifouling complex may be produced by combining an antifouling agent with a killer agent to form an auxiliary composition; and contacting the auxiliary composition with an alkylaluminum.

20 Claims, 4 Drawing Sheets

(56) References Cited

U.S. PATENT DOCUMENTS

| | | |
|---|---|---|
| 8,338,548 B2 | 12/2012 | Mazzucco et al. |
| 8,536,289 B2 | 9/2013 | Caputo et al. |
| 8,568,845 B2 | 10/2013 | Malm et al. |
| 8,735,514 B2 | 5/2014 | Baita et al. |
| 8,865,847 B2 | 10/2014 | Hoang et al. |
| 8,957,167 B2 | 2/2015 | Hussein et al. |
| 9,332,465 B2 | 5/2016 | Valliappan et al. |
| 9,771,439 B2 | 9/2017 | Mihan et al. |
| 9,809,656 B2 | 11/2017 | Pannell et al. |
| 2006/0264587 A1 | 11/2006 | Sell et al. |
| 2012/0283369 A1 | 11/2012 | Koelling et al. |
| 2013/0197171 A1 | 8/2013 | Baita et al. |
| 2014/0088274 A1 | 3/2014 | Ding et al. |
| 2016/0208026 A1* | 7/2016 | Covezzi ............... C08F 110/02 |

FOREIGN PATENT DOCUMENTS

| | | |
|---|---|---|
| CN | 103881338 B | 10/2018 |
| DE | 19615953 A1 | 10/1997 |
| EP | 811638 A2 | 12/1997 |
| EP | 1561762 A1 | 8/2005 |
| EP | 1255783 B1 | 12/2005 |
| EP | 2083023 A1 | 7/2009 |
| EP | 1252198 B1 | 8/2012 |
| EP | 3034519 A1 | 6/2016 |
| WO | 200066640 A1 | 11/2000 |
| WO | 2017144559 A1 | 8/2017 |

OTHER PUBLICATIONS

International Search Report issued in corresponding International Application No. PCT/IB2019/039763, dated Apr. 2, 2020 (4 pages).
Written Opinion of the International Searching Authority issued in corresponding International Application No. PCT/B2019/039763, dated Apr. 2, 2020 (7 pages).
International Search Report issued in corresponding international application No. PCT/IB2019/039762, dated Mar. 19, 2020 (4 pages).
Written Opinion of the International Searching Authority issued in corresponding international application No. PCT/IB2019/039762, dated Mar. 19, 2020 (8 pages).

\* cited by examiner

AUXILIARIES FOR OLEFIN POLYMERIZATION PROCESS

BACKGROUND

Polyolefins such as polyethylene (PE) and polypropylene (PP) may be used to manufacture a varied range of articles, including films, molded products, foams, and the like. Polyolefins may have characteristics such as high processability, low production cost, flexibility, low density and recycling possibility. However, physical and chemical properties of polyolefin compositions may exhibit varied responses depending on a number of factors such as molecular weight, distribution of molecular weights, content and distribution of comonomer (or comonomers), method of processing, and the like.

Reactors used for the polymerization or co-polymerization of olefins (e.g., loop reactors, liquid boiling-pool reactors, gas phase reactors, and the like) can encounter operating difficulties when the polyolefin polymer product adheres to the reactor interior wall and does not dislodge or break loose from the interior wall. This condition is known as "fouling" of the reactor. Fouling often occurs due to static electricity caused by tacking of charged polymer particles on walls and by the presence of very small particles containing active catalyst. The electrostatic charges promote polymer particles adhesion to the inner walls of pipes and equipment thus hindering the operational continuity of this system. Fouling often occurs when the polymer particles are transferred, e.g. between first and second polymerization stages or to the degassing system.

Recovery from fouling generally involves removing the adhering polymer layer, such as by washing the reactor with hot diluent, physical abrasion, or by high-pressure washing. However, reactor maintenance to remedy fouling often results in incurred expense and reactor downtime.

The use of antifouling agents for the production of polymers for food contact applications is further limited by restrictions that have been implemented by governmental regulatory bodies such as the European Commission and the U.S. Food and Drug Administration. Restricted compounds include ethoxylated amine, alkylbenzene sulfonic acid, random ethylene oxide/propylene oxide copolymer, and others.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of forming polymerization auxiliaries for a polymerization process that includes combining an antifouling agent with a killer agent to form an auxiliary composition; and contacting the auxiliary composition with an alkylaluminum.

In another aspect, embodiments disclosed herein relate to an antifouling complex that is produced by combining an antifouling agent with a killer agent to form an auxiliary composition; and contacting the auxiliary composition with an alkylaluminum.

Other aspects and advantages of the claimed subject matter will be apparent from the following description and the appended claims.

DETAILED DESCRIPTION

In one aspect, embodiments disclosed herein relate to polymerization processes that incorporate auxiliary compositions that minimize or eliminate fouling generation produced by polymer deposition in the inner walls of pipes and equipment. Auxiliary compositions in accordance with the present disclosure may include a mixture of antifouling agent, killer agent, and other possible additives.

Fouling is a common issue during olefin polymerization processes. It is known that fouling occurs when the polymer particles are transferred, e.g., between first and second polymerization stages and/or to a degassing system. Degassing systems used for processing bulk and slurry polymerizations often include a heat exchanger for vaporizing unreacted monomers, a flash drum or a bag filter that separates polymers and monomers (and optionally direct monomers for further processing, such as buy distillation), and a module for drying polymer and transferring downstream (often to an extruder or other equipment). Following degassing, produced polymer may be assayed to quantify electrostatic charge generated from friction within the inner walls of pipes and handling equipment. In some cases, electrostatic charge generation promotes polymer particle adhesion, which can lead to fouling an interruption of continuity within the system.

In one or more embodiments, polymerization methods may incorporate a continuous feed of auxiliary compositions during the production of polyolefins such as polypropylene homopolymers or copolymers. In some embodiments, auxiliary compositions may inhibit or kill continued catalytic activity following a polymerization, reducing fouling generation in subsequent processing steps. For example, auxiliary compositions in accordance with the present disclosure may be used to suppress fouling due to polymer deposition in the inner walls of pipes and equipment during degassing steps of a manufacturing process.

Auxiliary Compositions

Auxiliary compositions in accordance with the present disclosure may include an antifouling agent and a reaction killer that may be optionally combined with an organoaluminum to generate an auxiliary complex. In one or more embodiments, auxiliary compositions may be injected after a polymerization step to mitigate material deposition on pipes and equipment downstream of a polymerization reactor. Reaction killers may slow or halt polymerization in post-reactor steps, while antifouling agents may minimize electrostatic charge and may reduce the deposition of polymer and inorganic oxides and promotes greater operational continuity.

In one or more embodiments, auxiliary compositions may contain a mixture of killer agent that deactivates olefin polymerization catalyst systems (including catalysts, co-catalysts such as alkyl aluminum, and electron donors) and antifouling agent that reduces material deposition. In some embodiments, auxiliary compositions may be introduced after a polymerization step, such as between the polymerization step and the degassing step, to kill the catalytic system and avoiding fouling generation on inner walls of pipes and equipment in degassing. Auxiliary compositions may also be added to a reactant mixture prior to introduction into the polymerization process in some embodiments, and during the polymerization process in other embodiments.

Auxiliary compositions in accordance with the present disclosure may promote operational continuity due to the reduction of the electrostatic levels in powder transfer lines and degassing systems when introduced in an effective amount. In one or more embodiments, auxiliary compositions may include any combination of killer agent and antifouling agent and may be used to increase the homogeneity of polymer solutions generated in a polymerization reactor. After polymerization in a reactor, unreacted monomer may be recovered and recycled to a subsequent polymerization step.

In the following example, the function of components of the auxiliary composition is discussed in the context of a polymerization reaction of α-olefin in the presence of an organoaluminum co-catalyst. In general, fouling downstream of a polymerization reactor may be attributed at least in part to continued polymerization of residual reactants as the polymerized mixture is transferred to subsequent processes downstream. Fouling mitigation may then be achieved in some instances through deactivation of reactive species and catalysts responsible for polymer formation and chain extension.

In some cases, water may be used that inactivate the polymerization catalyst/co-catalyst. In the following scenario, polymerization of a polyolefin is sustained through the use of an organoaluminum co-catalyst having the structure $Al(R1)_3$, wherein R1 is an alkane group as $CH_3$, $C_2H_5$, $n-C_3H_7$ and $isoC_4H_9$. Upon contact with water, the organoaluminum converts to inorganic oxide ($Al_2O_3$) according to Eq. (1), which is drained with the polymer adhering to the inner walls of pipes and equipment.

$$Al(R1)_3 + 3H_2O \rightarrow Al_2O_3 + 3R1H \quad (1)$$

However, the generation of anodized aluminum due to the presence of water in the polymerization process impairs the plants operational continuity. Thus, it is beneficial to minimize the use of water or eliminate the presence of water in the polymerization process to avoid this effect. Moreover, in accordance with embodiments of the present disclosure, the use of a non-aqueous compound having an antifouling effect may improve the operational continuity of polymerization process.

Auxiliary compositions in accordance with the present disclosure may include a killer agent, an alcohol in this case, which reduces catalytic yield through the exchange reaction shown in Eq. (2). The alcohol is a compound having the formula R2OH, in particular R2 is a linear or branched alkyl group having 1 to 4 carbon atoms.

$$Al(R1)_3 + 3R2OH \rightarrow Al(OR1)_3 + 3R2H \quad (2)$$

In the following sections, the individual components of auxiliary compositions are discussed in turn and in greater detail.

Antifouling Agent

In one or more embodiments, auxiliary compositions may include an antifouling agent. Antifouling agents in accordance with the present disclosure may be used to promote the formation of a homogeneous mixture following a polymerization reaction, while avoiding the formation of polymer agglomerates that can buildup and adhere to piping and equipment of post-polymerization systems. In some instances, polymer agglomerates may detach from equipment surfaces and pass through to extrusion process, modifying the organoleptic properties of final product.

In one or more embodiments, antifouling agents may include a polar functional group such as hydroxyl, ester, ether, alkyl, alkoxy, aryloxy, siloxy, silane or sulfonate group. In some embodiments, antifouling agents may include polyglycerol esters, such as glycerol esters having the structure $R3CO_2O(CH_2CHOHCH_2)_2OH$, wherein R3 is a linear alkyl group having 6-26 carbon atoms, or 12 to 22 in more particular embodiments. Antifouling agents may also include other esters of fatty acids or ethoxylated amines compounds having the structure $R4N(CH_2CH_2OH)_2$, wherein R4 is a linear alkyl group having 6-26 carbon atoms or 12 to 22 in more particular embodiments. For example, the ester of a fatty acid may be formed from saturated or unsaturated fatty acids having a length of C6 to C26 or from C12 to C22 in more particular embodiments. Such fatty acids may be reacted in particular embodiments with a polyol such as glycerol. However, it is also understood that the polyol may have one or more acids reacted therewith including but not limited to the fatty acid. For example, it is understood that the one or more of the ester groups formed will be with an organic acid that is not a fatty acid such as acetic acid, citric acid or other shorter organic acids. The ester of a fatty acid may be used in any suitable form, such as in a solid state or mixed with a carrier in a liquid state In one or more embodiments, methods in accordance with the present disclosure may use an antifouling agent that is approved by a governmental regulatory body for use in a particular application, such as in one or more of the food and medical industries. In one or more embodiments, the antistatic agent is one that is listed in 21 C.F.R. 178.3130 as being approved by the U.S. Food and Drug Administration for use in food-packaging materials. In one or more embodiments, antifouling agents may include glycerol esters of fatty acids approved for the food sector and medical applications, such as commercially available Grindsted PGE O 80D or Grindsted PS432 marketed by Dupont™.

Some examples of compounds that are restricted under the European Union Plastic Directive and the United States Food and Drug Administration for polymers for food contact applications are ethoxylated amine, alkylbenzene sulfonic acid, random ethylene oxide/propylene oxide copolymer, among others. Due to growing of the restrictions of use these compounds as polymerization process aid for production of polymers for food contact some compounds of vegetable origin are studied to use as antifouling agent.

Killer Agent

In one or more embodiments, auxiliary compositions may include a killer agent that decreases or stops polymerization reactions and polymer chain extension by neutralizing reactive species and/or deactivating polymerization catalysts. Killer agents in accordance with the present disclosure may include linear and branched alcohols having the general formula R2OH, where R2 may be a linear or branched alkyl group having 1 to 4 carbon atoms or the combination of. Killer agents may include alcohols such as methanol, ethanol, propanol, butanol, and the like.

In one or more embodiments, auxiliary compositions may have a combination of killer agent and antifouling agent combined at a mass ratio in a range of 95:5 to 55:45. In some embodiments, auxiliary compositions may have a combination of killer agent and antifouling agent combined at a mass ratio in a range of 90:10 to 55:45.

Organoaluminum

In one or more embodiments, auxiliary compositions may include or be contacted with an alkylaluminum, equivalently referred to as an organoaluminum or co-catalyst in this disclosure. Alkylaluminums may include compounds having the structure $Al(R1)_3$, wherein R1 is an alkane group as $CH_3$, $C_2H_5$, n-$C_3H_7$ and iso-$C_4H_9$.

In one or more embodiments, an auxiliary composition may be combined with an alkylaluminum such that the ratio of alkylaluminum:antifouling agent are at a molar ratio falling within a range of 200:1 to 4:1, or having a lower limit of any of 4:1, 10:1, or 50:1 and an upper limit of any from 100:1, 150:1, or 200:1, where any lower limit can be used in combination with any upper limit.

Auxiliary Complex Formation

In one or more embodiments, antifouling agents may be combined with an alkylaluminum to generate an auxiliary complex. Without being limited to a particular theory, some proportion of antifouling agent may react with an alkylaluminum to form an aluminum salt that functions as an antifouling complex. In one or more embodiments, an organoaluminum may be combined with an auxiliary composition prior to or during a polymerization process to generate an active surface complex that may enhance antifouling activity. In some embodiments, contacting an auxiliary composition and an alkylaluminum may generate a solid phase compound in the polymerization mixture. In still other embodiments, the antifouling agent may be a polyglycerol ester that reacts with an alkylaluminum to generate a complex containing a mixture of polyglycerol ester, the alkyl aluminum, and an aluminum salt such as aluminum stearate.

Further, in one or more embodiments, the antifouling agent may be combined with an alkylaluminum (and form a complex) prior to its introduction into the polymerization process. However, in other embodiments, it is envisioned that the antifouling agent may be added without a prior reaction with the alkylaluminum, and instead react or complex in situ with the alkyl aluminum present in the polymerization process as a co-catalyst.

Additives

Various additives may also be combined with the auxiliary compositions of the present disclosure. In one or more embodiments, auxiliary compositions may include a carrier such as mineral oil, monoglycerides, monoglyceride esters such as acetic esters of monoglycerides, hydrocarbon solvents, and the like. In one or more embodiments, an auxiliary composition may contain a mass ratio of reaction killer:antifouling agent:carrier at a ratio within a range of 95:2.5:2.5 to 55:22.5:22.5.

Applications

Auxiliary compositions in accordance with the present disclosure may be adapted to any polymerization processes bulk, solution, slurry phase processes, and the like. The amount of polymerization auxiliaries may depend upon the catalyst system used and the polymer grade. For example, the polymerization auxiliaries may be fed at a rate into the reactor in an amount ranging from about 5 to 1000 ppm by weight, relative to the rate of polymer production In one or more embodiments, polymerization auxiliaries may be added to the reactor at a ppm of the polymer produced that ranges from a lower limit selected from any one of 0.5 ppm, 1 ppm, 5 ppm, 10 ppm, or 50 ppm to an upper limit selected from any one of 100 ppm, 150 ppm, and 500 ppm, where any lower limit may be combined with any upper limit. For example, a selected range of 5 to 150 ppm of auxiliary composition would mean that for a process having a production rate of polymer per minute, the auxiliary composition is added in the range of 5 to 150 ppm relative to the amount of polymer produced per minute.

Figure 1:
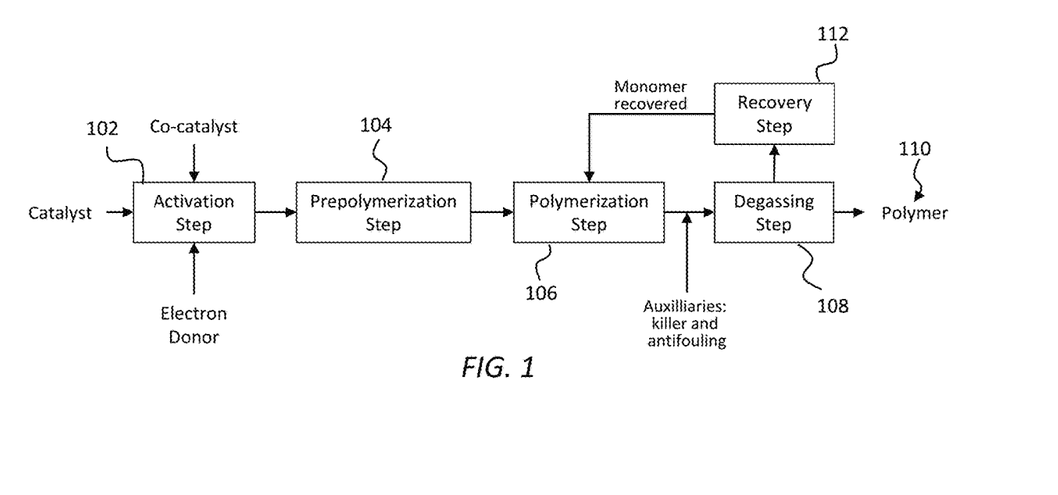
FIG. 1 is a flowchart depicting an auxiliary addition step in a polymerization process in accordance with embodiments of the present disclosure.

With particular respect to FIG. 1, a flow diagram of a polymerization process in accordance with the present disclosure is shown. At 102, olefin precursors are activated by combining alkylaluminum co-catalyst, catalyst, and an electron donor. The polymer mixture is then reacted in a pre-polymerization step, prior to polymerization at 106. Following polymerization, an auxiliary mixture is added to the produced polymer and transferred to equipment for degassing at 108. Polymer product is removed at 110 following degassing, while a non-polymer fraction is processed for recovery at 112. Monomer recovered may be recycled in some embodiments back into a polymerizing mixture at 106.

In one or more embodiments, the auxiliary composition may be fed to a degassing system as a liquid at room temperature, which may provide a reproducible dosage. For example, the auxiliary composition may include a carrier, such as mineral oil, monoglyceride, hexane or other hydrocarbon solvent that enables the mixture be in liquid state with low viscosity. Additionally, auxiliary compositions may include an antifouling agent solvated in killer agent, which may avoid phase separation at room temperature and the formation of agglomerates of antifouling agent in the polymer. Thus, the mixture is forwarded to a continuous stirred tank or included in a closed recirculating system including a non-agitated storage vessel and a pump. The mixture may be agitated or recirculated from 10 to 60 minutes in some embodiments, and for 30 minutes in some embodiments. In one or more embodiments, auxiliary compositions may have a stability for a time period of greater than 1 week or longer.

In one or more embodiments, an auxiliary complex may be formed at a temperature ranging from a lower limit selected from any one of 15° C., 20° C., and 22° C., to an upper limit selected from any one of 22° C., 25° C., and 30° C., where any lower limit may be combined with any upper limit. In some embodiments, auxiliary complexes may be stable for at least 1 week at a temperature ranging of 5° C. to 40° C.

In one or more embodiments, auxiliary compositions may be used to reduce the impact of electrostatic charges in the inner walls of pipes and equipment in a post-polymerization system. Post-polymerization systems often include a heat exchanger to vaporize liquid phase unreacted monomers, an optional flash drum or a bag filter that separates unreacted monomers from polymer product. Separated monomers may be transferred to a distillation unit in some embodiments prior to being returned to the reaction system. Post-polymerization systems may also include a drying system to remove excess solvent prior to transferring the polymer to subsequent processes such as extrusion.

In one or more embodiments, auxiliary compositions may be injected into a polymerization reaction discharge and/or powder transfer lines to reduce fouling and increase polymer recovery. In some embodiments, auxiliary compositions may be added to improve monomer separation, such as by bag filter, by dissipating electrostatic charge and improving powder transport. Auxiliary compositions may be applied prior to degassing to stop polymerization and reduce the formation of hot spots or agglomerates.

In one or more embodiments, auxiliary composition may form a homogenous single-phase solution when combined. In some embodiments, addition of an auxiliary composition to a product stream originating from a polymerization reaction may promote the formation and stability of the product stream as a single-phase solution.

In one or more embodiments, auxiliary compositions may have a mole ratio of killer agent to co-catalyst in a range having a lower limit selected from any one of 0.25, 0.5, and 1, to an upper limit selected from any one of 1, 2, and 2.5, where any lower limit may be combined with any upper limit.

In one or more embodiments, auxiliary compositions may have a mole ratio of antifouling agent to co-catalyst in a range having a lower limit selected from any one of 0.005, 0.01, 0.05, to an upper limit selected from any one of 0.1, 0.15, and 0.25, where any lower limit may be combined with any upper limit.

In one or more embodiments, auxiliary compositions may be substantially free of water.

The polymerization processes of methods in accordance with one or more embodiments are not particularly limited. However, in one or more embodiments, the polymerization process may particularly be a gas-phase polymerization. In particular embodiments, the polymerization may be a bulk, solution, or slurry phase process.

In one or more embodiments, the polymerization process may polymerize at least one or more of ethylene, propylene, butene, and hexene. In some embodiments, the polymerization process produces a homopolymer. The homopolymer produced by the method of one or more embodiments may be one of polypropylene and polyethylene. In some embodiments the polymerization process produces a copolymer. The copolymer produced by the method of one or more embodiments may be one of a polypropylene random copolymer, a polypropylene heterophasic copolymer, a polypropylene terpolymer, and linear low-density polyethylene.

In some embodiments the polymerization process may use either a metallocene or a Ziegler-Natta catalyst. The Ziegler-Natta and metallocene catalysts of one or more embodiments are not limited, at may be any Ziegler-Natta or metallocene catalyst known to one of ordinary skill in the art. The Ziegler-Natta catalyst may be a transition metal salt, wherein the transition metal is selected from group 4-12 metals. Some Ziegler-Natta catalysts may further be used with $MgCl_2$ and/or $TiCl_4$ and may comprise an internal electron donor selected from one or more of an aliphatic amine, amide, ester, ether, ketone, nitrile, phosphine, phosphoramide, thioether, thioester, aldehyde, alcoholate, or carboxylic acid. The metallocene catalyst of one or more embodiments may be a dichloride complex of the type $Cp*_2MCl_2$ were M is a transition metal such as Ti, Zr, and Hf, and Cp* is a substituted or unsubstituted cyclopentadienyl anion.

In one or more embodiments, the polymerization process may comprise the use of any suitable apparatus or equipment that is known in the art. In some embodiments, the polymerization process may comprise the use of one or more of a continually-stirred tank polymerization reactor, a loop polymerization reactor, a fluidized bed polymerization reactor, and a plug flow polymerization reactor.

In one or more embodiments, the polymerization process may use one or more gas phase reactors. In some embodiments, the polymerization process may use a gas phase reactor in combination with one or more of a slurry reactor and a bulk reactor.

Polymers

Polymers in accordance with one or more embodiments of the present disclosure may be produced by any of the methods detailed herein. As described above, the polymers of one or more embodiments may comprise monomers derived from one or more of ethylene, propylene, butene and hexene. In some embodiments, the polymer may be a homopolymer that, in some embodiments, may be one of polypropylene and polyethylene. In one or more embodiments the polymer may be a copolymer that, in some embodiments, may be one of a polypropylene random copolymer, a polypropylene heterophasic copolymer, a polypropylene terpolymer, and a linear low-density polyethylene.

EXAMPLES

The following examples are merely illustrative and should not be interpreted as limiting the scope of the present disclosure.

Example 1

The conductivity of a compound is an important property in determining whether the compound may be successfully used as an antistatic agent (or antistatic complex) in a polymerization process and can compensate for the electrostatic charges generated during the polymerization. The conductivity of Grindsted PS432 (by Dupont) (herein "GE") and mixtures of triethylaluminum/Grindsted PS432 (TEAL/GE), in proportions of both 1:1 and 10:1 mol/mol were measured using a digital conductivity meter model 1152 provided by EMCEE Electronics.

GE comprises two main substances: an oleic acid monoester with oxybis(propanediol) (CAS No. 49553-76-6); and an acetic ester of monoglyceride (CAS No. 736150-63-3).

The antistatic complexes formed by the reaction of the oleic acid monoester with a complex of oxybis(propanediol)/tri-ethylaluminum were investigated by $^1H$ NMR (Agilent 400 Mhz with DD2 console equipped with OneNMR probe). Samples were prepared in 5 mm tubes with deuterated cyclohexane. The oleic acid monoester with oxybis (propanediol) was diluted in a proportion of 10 mg to 0.6 mL of deuterated cyclohexane. The reactions of the oleic acid monoester with oxybis(propanediol)/tri-ethyl-aluminum were performed in a molar proportion of 1:1.

Figure 2:
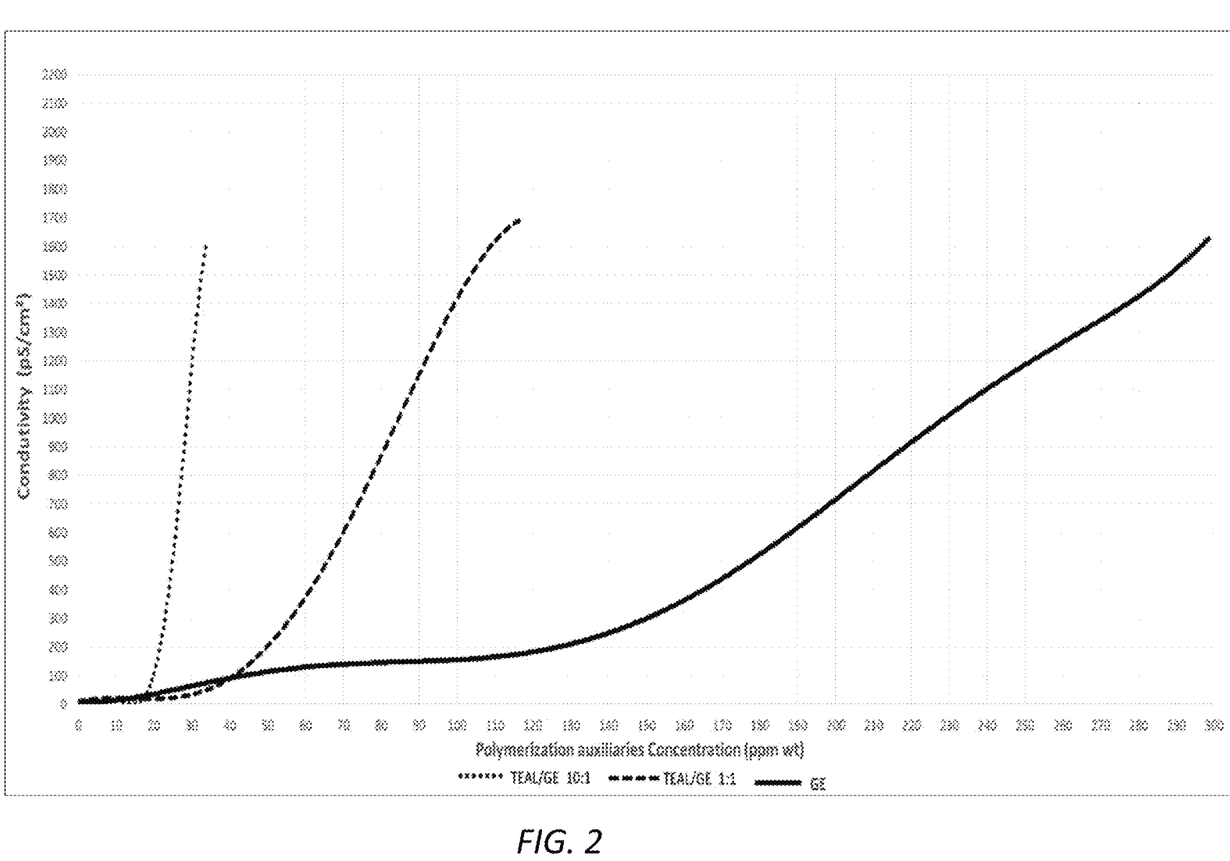
FIG. 2 depicts the conductivity of various antistatic agents and complexes.

Before starting the measurements, the reliability of the conductivity meter was confirmed by a measurement of hexane that provides a conductivity of zero. The solutions were prepared in a glove box proceeding the dilution of the antistatics in high purity hexane and this concentration is expressed in ppm wt. The pure Grindsted PS432 presented less conductivity than the mixture of Grindsted PS432/triethyl aluminum. The formation of an antistatic complex enhances the conductivity in as showed in FIG. 2.

The antistatic complex formed by the reaction of oleic acid monoester with oxybis(propanediol)/tri-ethylaluminum reaction shows two phases: a white solid and a liquid. These two phases were separated and 10 mg of each fraction were diluted in 0.6 mL of deuterated cyclohexane. The NMR spectrum of oleic acid monoester and oxybis(propanediol)

were simulated in the software Predict provided by Universidad del Valle (Cali—Colombia) and the hydrogen peaks were identified.

Figure 3:
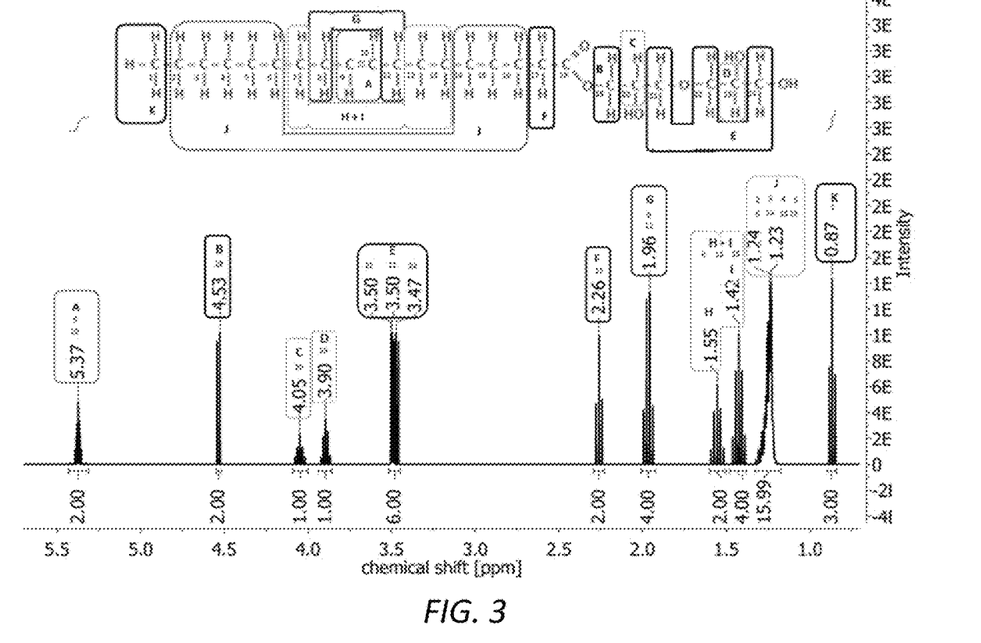
FIG. 3 depicts a simulated $^1$H NMR spectrum of oleic acid monoester and oxybis(propanediol).
Figure 4:
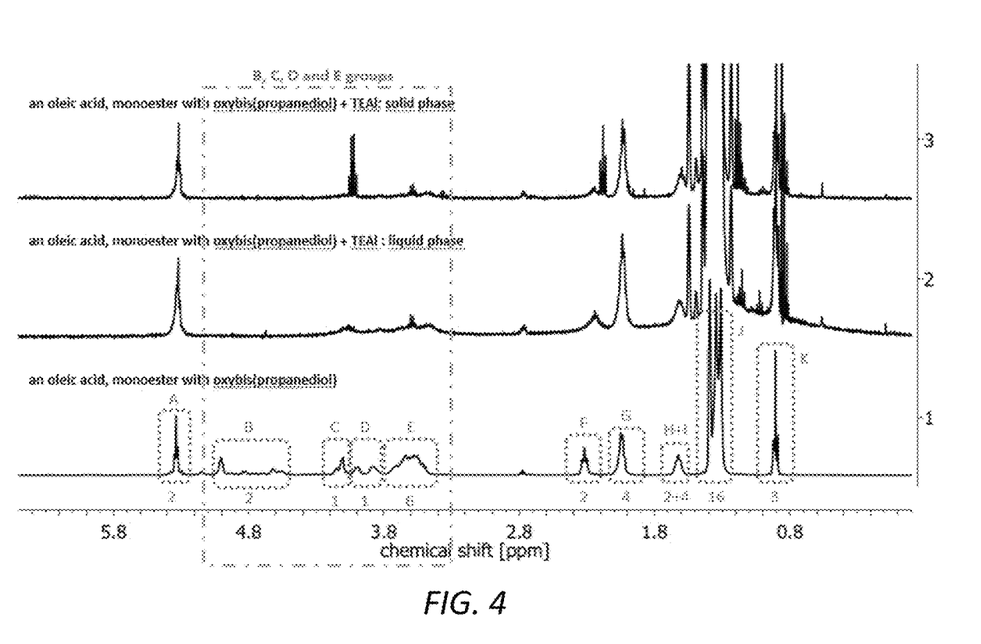
FIG. 4 depicts $^1$H NMR spectra of various antistatic complexes that comprise oleic acid monoester and oxybis (propanediol).

The simulated spectrum presented in FIG. 3 was used as basis to understand the NMR analysis showed in FIG. 4. The spectrum of the solid phase obtained by the reaction of oleic acid monoester with oxybis(propanediol)/tri-ethylaluminum shows an antistatic complex formation, and groups B, C, D and E were not clearly detected. The homogeneous liquid phase does not contain group B, indicating the molecule of oleic acid monoester with oxybis(propanediol) degrade at this carbon. Groups C, D and E were detected in the liquid phase spectrum.

Figure 5:
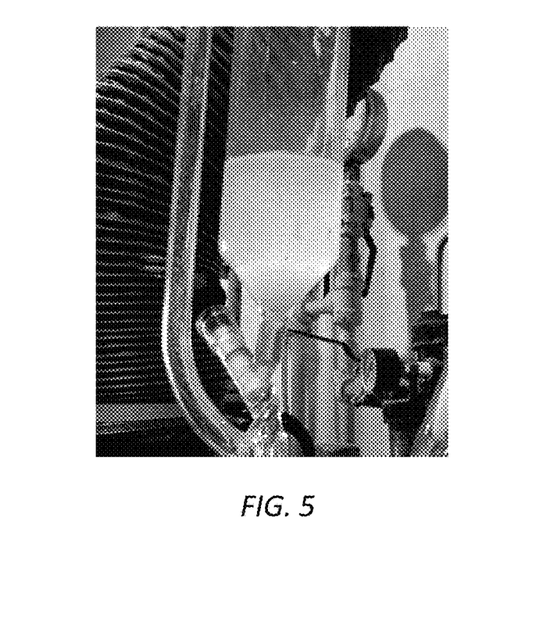
FIG. 5 depicts a photograph of the two phases that results from the reaction of oleic acid monoester and oxybis(propanediol) with triethylaluminum.

FIG. 5 shows the two phases formed by the reaction of oleic acid monoester with oxybis(propanediol)/tri-ethyl-aluminum.

Example 2

A mixture of Grindsted PS 432, (herein "GE") and ethanol in a proportion of 10:90 on a mass basis was injected in the degassing system of a liquid phase polypropylene commercial plant. The catalyst activator used was tri-ethyl-aluminum. The GE reacts with tri-ethyl-aluminum in excess from the activation reaction, to form an antistatic complex. The ethanol reacts with tri-ethyl-aluminum to form alkoxides, which do not act as an antistatic, according to reaction below:

$Al(CH_2CH_3)_3 + 3CH_3CH_2OH \rightarrow Al(OCH_2CH_3)_3 + 3CH_3CH_3$

Figure 6:
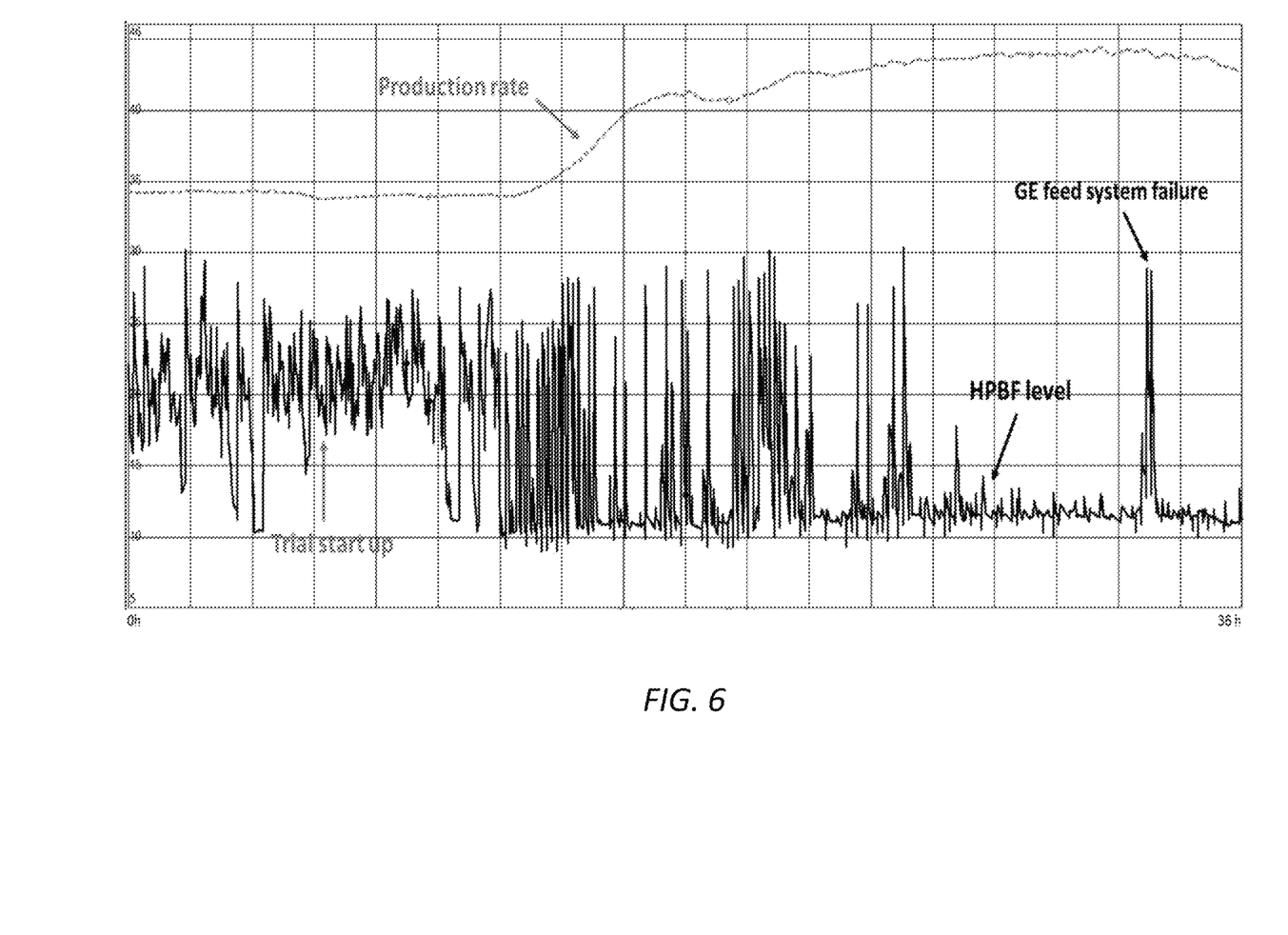
FIG. 6 shows the effect of an antistatic complex on a polypropylene polymerization.

The trial started at 35 t/h until 44 t/h of production rate during a polypropylene homopolymer polymerization. During operation, use of a GE:ethanol mixture was observed to have a better high pressure bag filter performance in terms of level oscillation (using a radioactive type level instrument) as presented in FIG. 6. Considering the ethanol system inventory, it was estimated that the effective feed of GE:ethanol mixture in the process began around 3 hours after start-up, which resulted in a change on level oscillation. After 5 hours considering a better performance on HPBF (high pressure bag filter), the production rate was increased to find some limitation. Before antistatic complex feeding, the level indication oscillated around 18% to 27%. After antistatic complex feeding the level indication oscillated around 10% to 15%. After 33 hours, a failure occurred in the GE:ethanol feed system, and the HPBF level increased showing the antistatic effectiveness.

Although the preceding description is described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:
1. A method of forming polymerization auxiliaries for a polymerization process, comprising:
combining an antifouling agent comprising a polyglycerol ester with a killer agent to form an auxiliary composition that is a homogenous single-phase solution; and
contacting the auxiliary composition with an alkylaluminum;
wherein the contacting occurs prior to a degassing step or during degassing.
2. The method of claim 1, wherein the contacting occurs prior to introduction into the polymerization process.
3. The method of claim 1, wherein the contacting occurs during introduction of the auxiliary composition into the polymerization process.
4. The method of claim 1, wherein the auxiliary composition comprises killer agent and antifouling agent at a mass ratio ranging from 90:10 to 55:45.
5. The method of claim 1, wherein upon the contacting, the alkylaluminum and antifouling agent have a molar ratio ranging from 200:1 to 4:1.
6. The method of claim 1, wherein the killer agent comprises an alcohol having 1 to 4 carbon atoms.
7. The method of claim 6, wherein the killer agent comprises ethanol.
8. The method of claim 1, wherein the alkylaluminium is triethylaluminum.
9. The method of claim 1, wherein the auxiliary composition is formed at a temperature ranging from 20 to 25° C.
10. The method of claim 1, wherein the auxiliary composition is stable for at least 1 week at a temperature ranging of 5° C. to 40° C.
11. The method of claim 1, wherein the auxiliary composition is injected at a rate into the polymerization process in an amount ranging from about 5 to 150 ppm by weight based on polymer production rate.
12. The method of claim 1, wherein the auxiliary composition further comprises a carrier.
13. The method of claim 12, wherein the carrier is selected from mineral oil, monoglyceride, or a hydrocarbon solvent.
14. The method of claim 1, wherein the polymerization process is selected from a bulk, solution, or slurry phase process.
15. The method of claim 1, wherein the auxiliary composition is free of water.
16. An antifouling complex produced by the method of claim 1.
17. The method of claim 1, wherein the auxiliary composition is introduced into the polymerization process after and not during a polymerization step.
18. A method of forming polymerization auxiliaries for a polymerization process, comprising:
combining an antifouling agent with a killer agent to form an auxiliary composition that is a homogenous single-phase solution; and
contacting the auxiliary composition with an alkylaluminum;
wherein the contacting occurs prior to a degassing step or during degassing and wherein the auxiliary composition is injected into a degassing system.
19. The method of claim 18, wherein the antifouling agent and the alkyl aluminum react to form an antifouling complex that comprises a polyglycerol ester, aluminum alkyls and aluminum stearates.
20. A method of forming polymerization auxiliaries for a polymerization process, comprising:

combining an antifouling agent with a killer agent to form an auxiliary composition that is a homogenous single-phase solution; and contacting the auxiliary composition with an alkylaluminum, wherein the antifouling agent and the alkyl aluminum react to form an antifouling complex that comprises a polyglycerol ester, aluminum alkyls and aluminum stearates;

wherein the contacting occurs prior to a degassing step or during degassing.

* * * * *